United States Patent [19]

Pierceall

[11] 4,136,479
[45] Jan. 30, 1979

[54] FISHING LURE

[76] Inventor: Lewis Pierceall, Rte. 2, Lot 15, Chapel Hill, N.C. 27514

[21] Appl. No.: 852,096

[22] Filed: Nov. 16, 1977

[51] Int. Cl.$^2$ ............................................. A01K 85/00
[52] U.S. Cl. ................................ 43/42.22; 43/42.27; 43/42.32; 43/42.37
[58] Field of Search ................. 43/42.22, 42.23, 42.24, 43/42.25, 42.32, 42.37, 42.26, 42.27

[56] References Cited
U.S. PATENT DOCUMENTS

| | | | |
|---|---|---|---|
| 2,575,609 | 11/1951 | Alderman | 43/42.22 |
| 2,599,128 | 6/1952 | Roberts | 43/42.27 X |
| 2,635,381 | 4/1953 | Coons | 43/42.24 |
| 3,724,116 | 4/1973 | Linder et al. | 43/42.24 |
| 3,958,358 | 5/1976 | Firmin | 43/42.27 X |

*Primary Examiner*—Nicholas P. Godici
*Assistant Examiner*—Robert Olszewski
*Attorney, Agent, or Firm*—B. B. Olive

[57] ABSTRACT

A fishing lure intended primarily for luring game fish comprises a simulated worm having the leading portion of the shank of a fishhook passing therethrough, the trailing portion of the fishhook being adapted for engaging the simulated worm, Texas style, and having a thin, bendable vane member secured to the shank of the fishhook with the outer surface of the vane member having a white, resilient coating, the inner surface of the vane member being shiny, and the leading end of the vane member having a pointed shape.

1 Claim, 8 Drawing Figures

U.S. Patent       Jan. 30, 1979       4,136,479
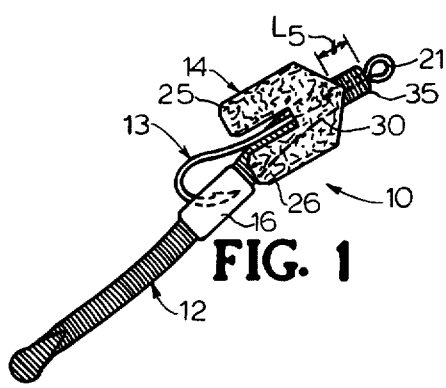
FIG. 1
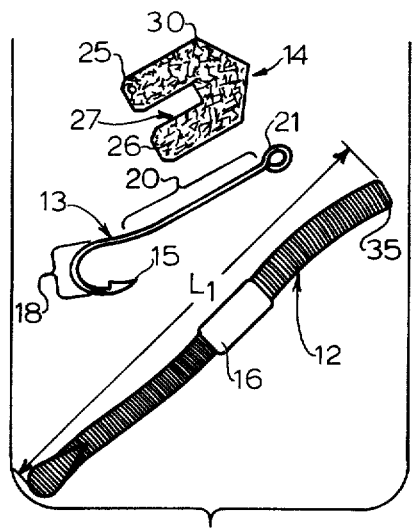
FIG. 2
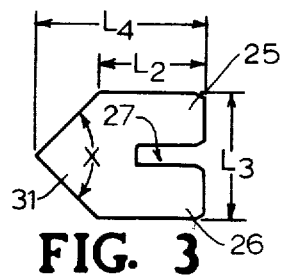
FIG. 3
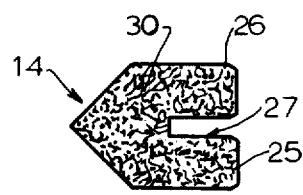
FIG. 4
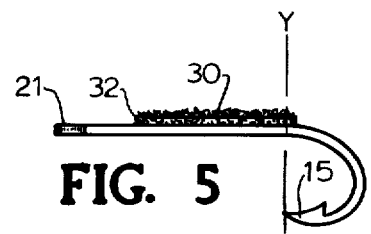
FIG. 5
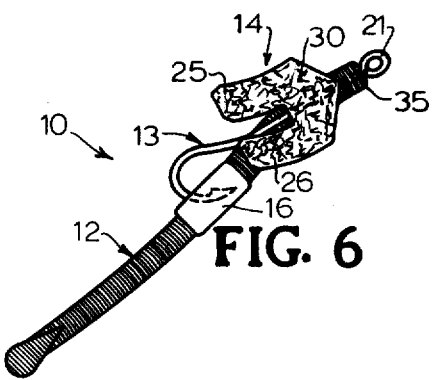
FIG. 7
FIG. 6
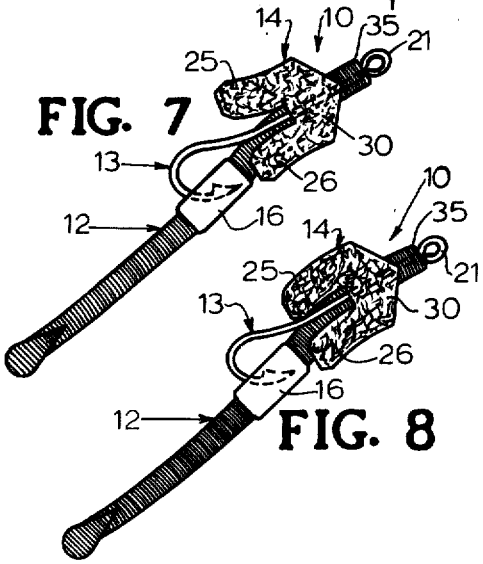
FIG. 8

FISHING LURE

BACKGROUND OF THE INVENTION

1. Field of the Invention

The present invention is concerned with a fishing lure construction and specifically with a lure intended for luring game fish.

2. Description of the Prior Art

Due to the many unpredictable factors associated with the art of fishing, there remains an unending search for the most perfect lure for particular kinds of fish and also for a variety of lures to meet different fishing situations. Relevant to the present invention, U.S. Pat. No. 3,748,773 is recognized as having previously described a fishing lure with a flexible, worm-like body and arranged so that the leading end of the shank of the fishhook passes through the head portion of the worm. Recognition is also given to the fact that various types of guide vanes have been secured to various hook-lure configurations in prior art constructions. U.S. Pat. Nos. 1,177,281; 2,635,381; and 3,724,117 are cited as examples to broadly illustrate the state of the art in this regard.

Taking all of the prior art known to applicant into account, there has not been previously provided a fishing lure having a worm-like body with the shank of the fishhook mounted in the head portion of the worm and with a bendable vane having the opposite sides of the vane with different surface treatments and the leading end pointed specifically for luring game fish.

SUMMARY OF THE INVENTION

A fishing lure, according to the invention, includes a flexible body in the nature of a simulated worm. The leading end of the shank of the fishhook passes through the head portion of the worm and a vane member is secured on the exposed intermediate portion of the shank of the fishhook. The vane member is coated on the outer side with a resilient, white coating designed to attract game fish and on the opposite inner side has a bright finish. The leading end of the vane is pointed to permit use of the lure in thick grass and weeds. The trailing ends of the vane member are in the nature of divided foils and can be bent in various configurations for achieving various lure movements upon retrieval of the lure.

DESCRIPTION OF THE DRAWINGS

FIG. 1 is a perspective view of a fishing lure made according to the invention.

FIG. 2 is an exploded view of the simulated worm, fishhook and vane member comprising the invention.

FIG. 3 is a plan view of the inner surface of the vane member.

FIG. 4 is a plan view of the outer coated surface of the vane member.

FIG. 5 is an elevation view illustrating the relative securement and positioning of the vane member on the fishhook shank portion.

FIGS. 6, 7 and 8 illustrate the vane foils bent in various configurations for achieving various lure movements upon retrieval of the lure.

DESCRIPTION OF THE PREFERRED EMBODIMENT

The improved fishing lure 10 of the present invention comprises a simulated worm body 12, a fishhook 13 and a vane member 14.

The body 12 partakes of being a simulated worm well known in the art and is preferably of the usual commercial type within a range of 4 inches to 6 inches in length indicated by dimension $L_1$ (FIG. 2). The body 12 preferably comprises a buoyant-type simulated worm and is preferably of a dark color. It is also desired that the worm body 12 be adapted to being set, Texas style, by having the barb 15 of fishhook 13 penetrate a middle worm portion 16 as illustrated. In this manner, once the fishhook is set, the middle worm portion 16 will tend to slide over the barb 15 and reside on the hook bill 18.

Fishhook 13 is of conventional construction and comprises a shank 20, an eyelet 21, and the previously-mentioned barb 15 and hook bill 18. For large game fish, fishhook 13 would typically comprise, for example, a size 1/0 or 2/0. For smaller game fish, fishhook 13 would comprise a No. 1, No. 2, No. 3, or No. 4 type fishhook though it is understood that the fishhook size will be determined by the fisherman's preference and experience.

The vane 14 is formed of a thin, bendable, sheet metal, such as tin or polished aluminum sheet. The leading end of vane 14 is rearwardly tapered and effectively pointed at an angle X of 90 degrees in the illustrated example (see FIG. 3). The rearwardly tapered or pointed leading end of vane member 14 permits lure 10 to be fished in thick grass and weeds and not become weighted down with collected grass or weeds as the lure is pulled through the weeds and grass. Thus, lure 10 stays relatively grass free during casting, trolling and retrieving. A pair of independently adjustable foils 25, 26 reside on either side of a slot 27 formed in member 14. FIGS. 6-8 illustrate the manner in which the foils 25, 26 can be bent depending on the desires of the fisherman in particular fishing situations.

Vane 14 is secured by soldering, or the like, to the shank 20 of fishhook 13 so as to generally occupy a plane, in the unbent foil configuration, which is substantially perpendicular to the plane of hook bill 18 as illustrated in the various drawings. It will also be noted, as indicated by the reference line Y—Y (see FIG. 5), that the trailing end of vane 14 substantially aligns with the leading end of barb 15. Outer surface 30 is coated with a flexible, preferably white, silicone rubber coating which also preferably coats the outer peripheral edges 32 of vane 14. The characteristics of the coating applied to outer surface 30 of vane 14 are several. The coating should have an adhesive nature so that it tends to adhere to the vane 14. Further, such coating should not tend to flake or shred during use of lure 10. The color should preferably also be white to simulate the white side of a minnow or other bait having a light colored or white surface. For example, it is known that bass, a game fish, will eat snakes and are attracted to the white belly portion of the snake. Bass are also known to be attracted to the white side of a minnow. Thus, the coating on outer surface 30 simulates this natural attraction for bait found in nature. The coating on outer surface 30 should also exhibit a flexible, resilient nature; should be soft; and should be irregular. Such a coating has been discovered as being a practical means for giving the fish the feeling of biting "flesh" when the fish strikes the lure. Also, the white color tends to simulate the fish biting natural bait as it does in a normal habitat.

The opposite inner surface 31 of vane 14, which is secured to shank 20 of fishhook 13, is purposely made shiny or bright to provide a reflecting, fish-attracting surface.

It will also be noted (see FIG. 1) that the leading end of the shank 20 passes through the head portion 35 of the worm body 12 with the distance $L_5$ being preferably from three-eighths inch to one-half inch which keeps this portion of the worm body 12 in a fixed position during casting and retrieval operations.

As illustrated in FIGS. 6 through 8, the foils 25, 26 can be bent in various directions to control up, down and rotating motions of lure 10. Also, vane 14 provides surfaces and a means for the fish's jaws to rotate the hook from vertical to flat orientations when the fisherman feels the strike and desires to set the hook.

As an illustration of a form of the preferred embodiment, length $L_1$ of simulated worm 12 is five and one-half inches in length and vane member 14 has the following dimensions: length $L_2$ is three-quarters of an inch; width $L_3$ is thirteen-sixteenths of an inch; and length $L_4$ is one and one-eighth inches. In this same example, vane member 14 was made of thin, bendable tin and coated on the outer surface as described.

In summary, it is believed that the particular type of lure described now offers the fisherman not only an improved lure for fishing game fish but, also, contributes to the general need for variety in the types of lures needed, particularly for fishing game fish.

What is claimed is:

1. A fishing lure, comprising:
   a. a flexible body member in the nature of an elongated flexible simulated worm having defined head and tail extremities;
   b. a fishhook member having an eye formed at the leading end, a central rod-like shank and at the trailing end a curved hook having a forwardly-directed barb, said flexible body member being mounted on said fishhook member by means of a minor leading portion of said fishhook shank extending through and being confined within a portion of the body of said flexible body member between said eye and a point of exit from said flexible body member rearwardly thereof with said eye residing proximate said head extremity and said curved hook extending outwardly from said flexible body member and said hook barb being directed toward an intermediate portion of said body member;
   c. a vane structure including a pair of oppositely-positioned, trailing, bendable, vane portions extending outwardlly from said shank and an integral leading and pointed vane portion forming an extension of said trailing vane portions and means securing said leading vane portion to an intermediate portion of said shank forward of said curved hook, said leading vane portion residing in a plane substantially perpendicular to the plane of said curved hook and said trailing portions providing adjustable guide means designed to affect the path of movement of said fishing lure through water; and
   d. surface finish means providing on the inner side of said vane structure adjacent said flexible body member a substantially shiny surface and on the opposite outer side of said vane structure a substantially white, soft, irregular, non-flaking coating.

* * * * *